United States Patent
Brock

(10) Patent No.: US 9,475,731 B2
(45) Date of Patent: Oct. 25, 2016

(54) DRY APPLICATION PAPERCRETE

(71) Applicant: James Robert Brock, Rancho de Taos, NM (US)

(72) Inventor: James Robert Brock, Rancho de Taos, NM (US)

( * ) Notice: Subject to any disclaimer, the term of this patent is extended or adjusted under 35 U.S.C. 154(b) by 0 days.

(21) Appl. No.: 13/938,667

(22) Filed: Jul. 10, 2013

(65) Prior Publication Data

US 2014/0014005 A1 Jan. 16, 2014

Related U.S. Application Data

(63) Continuation-in-part of application No. 12/604,541, filed on Oct. 23, 2009, now abandoned.

(51) Int. Cl.
| | |
|---|---|
| *C04B 24/38* | (2006.01) |
| *C04B 28/04* | (2006.01) |
| *C04B 22/06* | (2006.01) |
| *C04B 40/06* | (2006.01) |
| *C04B 103/30* | (2006.01) |

(52) U.S. Cl.
CPC .......... *C04B 24/383* (2013.01); *C04B 28/04* (2013.01); *Y02W 30/97* (2015.05)

(58) Field of Classification Search
CPC ........ C08L 1/02; C08L 97/005; C08L 97/02; C08L 2205/16; C08K 7/02; C04B 24/383; C04B 18/241; D21H 11/18; D21H 15/02; D21H 17/33; D21H 17/37; D21H 17/375; D21H 25/06; D21H 27/30; B27N 3/002
See application file for complete search history.

(56) References Cited

U.S. PATENT DOCUMENTS

| | | | | |
|---|---|---|---|---|
| 4,393,636 | A | * 7/1983 | Rockstead et al. | ............. 52/381 |
| 4,761,203 | A | * 8/1988 | Vinson | ............................. 162/9 |
| 2002/0139082 | A1 | 10/2002 | DeFord et al. | |
| 2006/0288909 | A1* | 12/2006 | Naji et al. | ..................... 106/681 |
| 2010/0139527 | A1 | 6/2010 | Fernandez-Garcia | |

FOREIGN PATENT DOCUMENTS

WO 2008/063040 5/2008

* cited by examiner

*Primary Examiner* — Jun Li
*Assistant Examiner* — Karam Hijji
(74) *Attorney, Agent, or Firm* — Whitham, Curtis & Cook, P.C.

(57) ABSTRACT

A dry papercrete mix is formed by preparing a wet pulp of fiber material such as newsprint and sharp sand by mixing sand, fiber material and water in a batch or continuous mixer, drying the pulp to a moisture content below that which will cause a reaction with Portland cement and adding additional sand and/or pumice and Portland cement. The resulting dry mix can then be handled, stored and used in the manner which is conventional for concrete. The dry papercrete mix can also be applied by pouring the dry papercrete mix into a form in a dry state and injecting water into the dry mix until the mix is sufficiently wetted without mixing in the manner common for concrete. Structural modules and a technique for joining them into a structure are particularly appropriate to the use of dry application papercrete.

1 Claim, 6 Drawing Sheets

DRY APPLICATION PAPERCRETE

CROSS-REFERENCE TO RELATED APPLICATIONS

This application is a continuation-in-part of U.S. Utility patent application Ser. No. 12/604,541, filed Oct. 23, 2009, which is hereby incorporated by reference in its entirety and priority of which is hereby claimed in regard to all subject matter common to both that application and the present application.

FIELD OF THE INVENTION

The present invention generally relates to cement-based materials and, more particularly, to compositions including wood/paper fiber as a significant constituent thereof as an alternative to concrete.

BACKGROUND OF THE INVENTION

Concrete is a mixture of sand and/or gravel and Portland cement and, when mixed with water, forms a slurry that can be molded into virtually any shape. After such mixing, a chemical reaction occurs in the presence of water that causes the slurry to harden over the course of several days (often referred to as curing or, much less accurately, as drying since the concrete must remain hydrated for curing to take place) into an extremely hard, strong and durable material that is highly weather-resistant and thus especially well suited to large structures such as buildings, roads and bridges. Although concrete is much stronger in compression than in tension, reinforcing materials such as iron rods can be embedded in the structure as it is cast in-situ or formed into prefabricated components for later assembly in order to develop overall strength in tension.

However, concrete has several properties that are not optimal for some applications for which it is otherwise well-suited. Specifically, it is very heavy, having a weight per unit volume comparable to stone and, while weight can be desirable in some applications, such as dams, anchors and the like, structures having a large proportion of concrete need very substantial support. Also, Portland cement is very expensive and filler materials such as sand or gravel are usually added to the mixture to a proportion as large as possible without weakening the final cured concrete product beyond specifications. Further, while concrete has a high specific heat and is capable of storing substantial energy in the form of heat, it is also highly thermally conductive (again, substantially comparable to stone) and thus generally requires insulation if used for the perimeter of buildings. Further, the combination of hardness and weakness in tension causes substantial difficulty in further working (e.g. cutting, drilling, setting nails or screws and the like) of the concrete shapes once they have fully cured. For example, nails to be driven into fully cured concrete must generally be hardened and resistant to bending and require very high force to be applied to drive them into concrete while nails that have been successfully driven may be found to be loose and are not solidly retained by the concrete while the force required to drive them may crack or at least weaken the concrete or cause persistent stresses that may do so over time.

To alter these properties, there has been much interest in concrete compositions having a relatively high content of wood, cellulose or paper fiber therein, especially as a technique for recycling of discarded paper such as newsprint which is generated in large volume. However, while there has been some success in developing such concrete-based compositions, sometimes referred to as papercrete, the processing of paper to obtain a proper consistency by techniques developed to date has proven to be energy-intensive, time-consuming and expensive. Further, mixing of such compositions is difficult (possibly due to the differences in buoyancy and water absorption of wood/paper fiber and other constituent materials) and has generally been done in small batches of a fraction of a cubic yard in a process that is not easily scalable to larger quantities consistent with delivering repeatably acceptable and substantially uniform results.

Another difficulty presented by the use of concrete in construction is the need to build large and strong forms of other materials such as wood or metal when concrete is to be cast in-situ or to form construction modules which can represent a significant cost of the finished structure. When similar shapes are to be formed, some expense can be avoided by re-use of such forms. However, such re-use for in-situ concrete construction is labor intensive and cost savings are marginal but may be economical in forming a large number of similar prefabricated shapes that can later be assembled into a structure.

To avoid some of the labor costs for forming concrete shapes which are largely vertical, however, a technique called slip-forming has been developed which involves multiple pours of concrete mix as the form is incrementally moved. However, this technique has proven somewhat dangerous since the degree of curing of a given pour of concrete mix must be sufficient to support the weight of both the next and further subsequent concrete pours as well as the form into which such pours are made and machinery to compact the concrete mix within the form. Numerous construction accidents have occurred when a sufficient cure of the concrete mix is not achieved prior to a subsequent pour. Therefore, slip form techniques are inherently slow, when performed safely. Conversely, if the cure is more complete than necessary for adequate structural support, one pour may not adhere to or integrate sufficiently with a previous pour, leaving regions of weakness and/or persistent stress within the completed concrete shape.

SUMMARY OF THE INVENTION

It is therefore an object of the present invention to provide a concrete-based material which includes a substantial fraction of wood/cellulose/paper fiber to reduce density, increase tensile strength and, when cured, has good insulative properties and which can be made, handled and applied as a dry granular material that does not require mixing with water prior to application.

It is another object of the invention to provide a method of use of the concrete-based composition which is easier, faster, more consistent and economical and safer than slip-form concrete casting.

In order to accomplish these and other objects of the invention, a dry papercrete mix is provided comprising pulverized dried pulp of fiber material and sand, additional sand and Portland cement.

In accordance with another aspect of the invention, a method of using a dry papercrete mix comprising a pulp of sand and fiber material and sand, additional sand or pumice and Portland cement is provided comprising steps of pouring dry papercrete mix into a desired volume and injecting water into the dry papercrete mix until the dry papercrete mix is wetted.

In accordance with a further aspect of the invention, a method of preparing a pulp of fiber material and sharp sand is provided comprising steps of mixing fiber material and sharp sand in a ratio of approximately 3:5 with water to form a wet pulp, and drying the wet pulp to a moisture level below that which will react with Portland cement.

In accordance with yet another aspect of the invention, a method is provided for preparing cellulose/paper pulp by grinding in a hammer mill, with or without inclusion of waste glass ground to pass through a 2 mm screen and which may be further ground concurrently with the cellulose/paper pulp.

In accordance with a yet further object of the invention, a method of preparing a dry papercrete mix is provided comprising steps of mixing fiber material and sharp sand in a ratio of approximately 3:5 with water to form a wet pulp, drying the wet pulp to a moisture level below that which will react with Portland cement to form a dry fiber and sand pulp, and mixing sand and/or pumice and Portland cement with said dry fiber and sand pulp to form said dry papercrete mix.

In accordance with another further aspect of the invention, a dry mixture for addition to a dry concrete mix to form a dry papercrete mix is provided comprising dry pulverized cellulose/paper fiber particles having sharp sand and/or glass particles of a size that passes through a 2 mm mesh screen adhering to particles of pulverized cellulose/paper pulp.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1A:
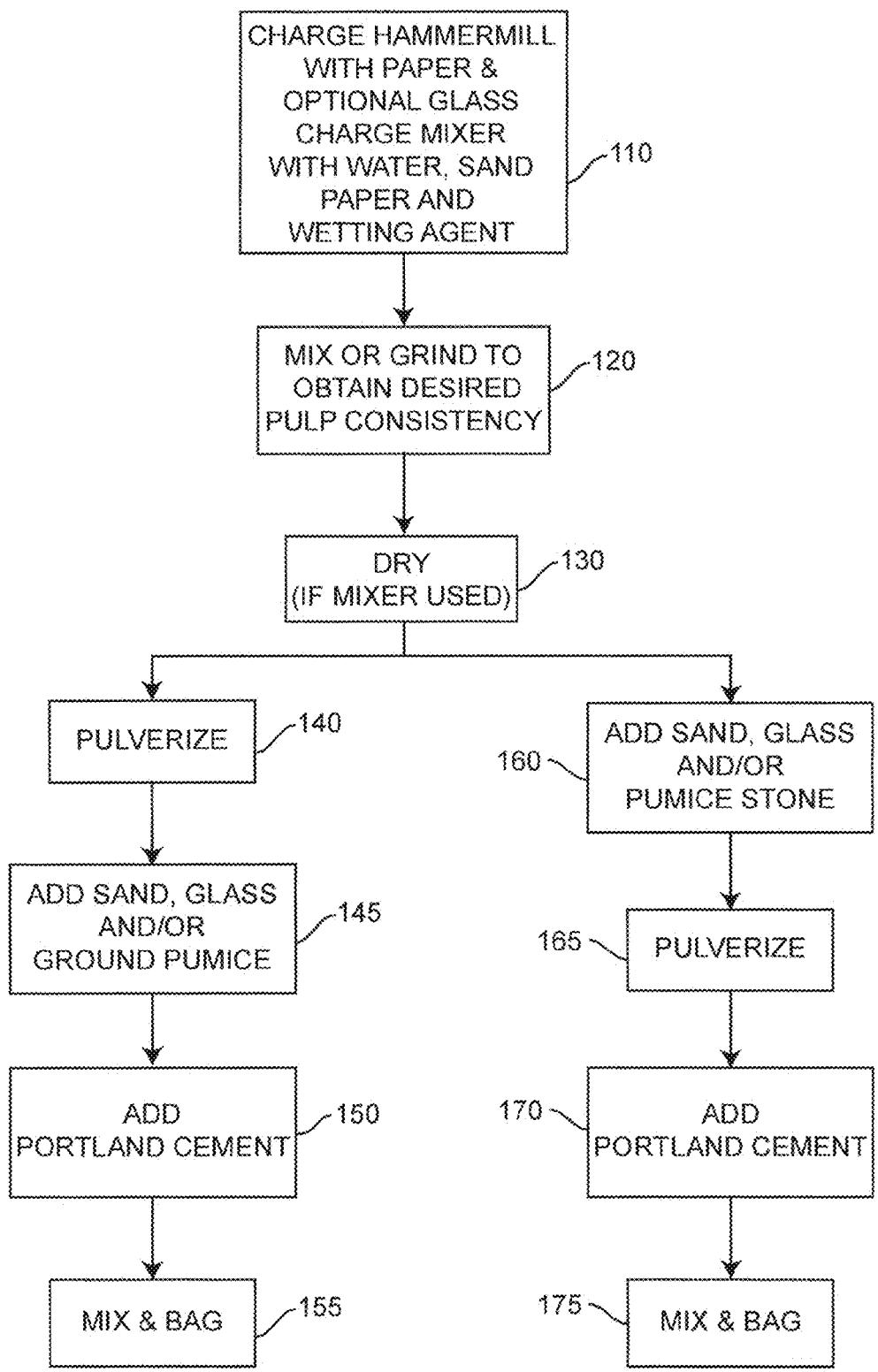
FIG. 1A is a flow chart illustrating preparation of the concrete composition in accordance with the invention.

Referring now to the drawings, and more particularly to FIG. 1A, there is shown a flow chart for preparation of the dry application papercrete in accordance with the invention. As alluded to above, while some success has been achieved in developing concrete-based materials having a significant paper, cellulose or wood fiber (hereinafter collectively referred to as wood/paper fiber or cellulose/paper fiber) content, a major problem is the difficulty of achieving the proper consistency of fibers from the paper, cellulose or recycled wood it is desired to use and the energy required to obtain a useable fiber consistency. The inventor has discovered, as disclosed in U.S. patent application Ser. No. 11/459,735 (which is hereby fully incorporated by reference) that proper fiber consistency can be obtained more quickly and consistently and in an energy-efficient manner by mixing the paper or wood (e.g. in the form of sawdust, shavings or chips) with sand and water (and a small amount of a wetting agent such as soap) in a standard concrete mixer until the desired fiber consistency is achieved. However, this technique was used in the context of preparing a wet application papercrete material for direct use in forms by removing excess water, adding additional sand or gravel and Portland cement to the mixer and continuing to mix the material until ready for pouring into a mold or otherwise applied as a wet papercrete mix. Such a procedure, of course, is limited to in-situ, small batch application or the making of prefabricated components of limited size as is also disclosed in the above-incorporated patent application. It does not lend itself to making the material widely available to the public or contractors or to the formation of structures of large size. Moreover, even though the removal of excess water may be avoided by using less water during grinding or adding more filler material of small particle size (e.g. gravel does not work well since fiber pulp does not adhere to it well), the process is somewhat more complex and requires more time and effort than the use of commercially available dry concrete mixes even when the papercrete is prepared as a wet mix.

In this connection, a distinction must be drawn between so-called dry concrete mixes which are a dry mixture of sand and/or gravel and Portland cement which remain in a granular form until mixed with water in a concrete mixer until it is in a condition to be applied as a wet concrete mix. This distinction will be maintained herein by referring to the former as "dry" or a "dry mix" and which terminology may be applied to the invention, as well, without making any admission of a dry mix containing paper/wood fiber being known in the art or any such admission being inferred by such usage or terminology. As applied to the present invention, such terminology should be understood as comprehending materials which can be applied (e.g. placed in a form or mold) in a dry form and water mixed therewith after such application. It is also to be understood that a dry application papercrete mix can also be mixed with water is the manner currently used for mixing of concrete to form a wet application material.

Thus, the invention seeks to provide a product that can be stored, marketed and used much in the manner of current, commercially available dry concrete mixes. Additionally, it has been found that a dry papercrete mix provides additional advantages in handling and application as well as in improved qualities of cured papercrete as will be discussed in greater detail below.

Returning now to FIG. 1A, the preferred method of preparing a dry papercrete mix will now be discussed. It should be noted that the currently preferred technique for preparing a dry papercrete mix is a batch process since commercial quantities are not currently required by the inventor. However, for preparation of commercial quantities of dry papercrete mix, a more continuous process would be preferred and can be performed using apparatus known in the art for continuous material processing.

Initially, as disclosed in the above-incorporated patent application, a mixer is first charged with a quantity of paper (e.g. newsprint) or other source of wood, paper or other fiber, preferably cellulose but some proportion of other fiber (e.g. cotton, wool or synthetic textile material) composition can be included, as desired. Sharp concrete sand, water and a small amount of wetting agent such as liquid soap are also charged into the mixer as indicated at 110. If found to be desirable or needed for some applications, a mold inhibitor or mildewcide can be included. The proportions of paper, sand and water currently preferred may vary widely depending on several factors which will now be discussed.

It has been found that the wood/fiber pulp produced by the invention has some self-adhesive qualities and, if prepared by agitation in water without the use of sand, and then dried, tends to form clumps which, although the clumps can be easily broken to the desired consistency, requires additional machinery or manual effort to do so. The duration of agitation required to achieve the desired consistency as well as the drying time tends to become extended if no sand is used.

The addition of sharp concrete sand provides a grinding mechanism and aeration that reduces drying time. The use of waste glass that has been ground or crushed to a particle size that will pass through a 2 mm mesh screen as will be discussed in greater detail below also provides an enhanced grinding mechanism for the cellulose/paper pulp and can be substituted for all or any proportion of the sand in this process. A sand/glass to wood/paper ratio as low as 5:3 with 50-60 gallons of water provides a pulp that has significantly reduced required times for both the pulping and drying processes although significant clumping will occur. However, only relatively slight clumping effect with clumps that can be much more easily broken is observed at proportions of 200 pounds sand/glass to 30 pounds paper (a sand/wood/paper fiber ratio of about 6.6:1) and 50 gallons of water (and about one to two ounces of wetting agent which is non-critical to the practice of the in invention and which is common to the other examples discussed herein). As the proportion of sand to wood/paper material is increased, the tendency toward clumping substantially disappears at a sand to wood/paper ratio by weight of about 20:1 and, as that ratio is further increased, the amount of water effective for the pulping process can be reduced and aeration is increased; both of which accelerate drying of the pulp. The proportion of sand/glass can also be raised well above the proportion of sand/glass which is desirable in a final dry papercrete mix since excess sand/glass can be easily removed by simple screening and the excess sand/glass reused in subsequent pulping processes and/or included in the final dry papercrete mix.

The proportion of sand/glass in the dried pulp and sand mixture can always be easily determined, particularly in batch processes by its weight and known dry weight of the initial amount of wood/paper included. Such a determination would be somewhat more complicated for a continuous pulping/drying process but can be estimated from the weight of a representative sample volume and, in any case, is not particularly critical. A proportion of 600 pounds of sand to 15 pounds of wood/paper (a sand to wood/paper ratio of 40:1) has been found to be satisfactory for some applications or uses but is considered by the inventor to be possibly somewhat above the optimum ratio or proportion for other applications or uses and requires significant handling of sand/glass removed during the drying process. The slight adhesive properties of the wood/paper pulp is sufficient to retain about one-half to two-thirds of the sand/glass that will be desired in the final dry papercrete mix; allowing the excess sand to be readily removed and replaced as needed in the dry papercrete mix. The preferred sand to wood/paper ratio is thus about 20:1 to 35:1 and thirty to forty gallons of water which allows pulping to be completed in only a few minutes while drying can be accomplished in several hours, depending on conditions and proportion of sand.

In this regard, the weights of sand/glass and paper mentioned above correspond to a batch of sand and wood/paper fiber that can be accommodated in a commercially available nine cubic foot concrete mixer. Further, such batches correspond to amounts of pulp that are deemed desirable for a dry papercrete mix that corresponds to inclusion of 94 pounds of Portland cement; a well-established unit measure for packaging of Portland cement closely corresponding to one cubic foot dry volume. Recommended ratios of sand to Portland cement are generally in the range of 5:1 to 6:1 which can be varied somewhat in accordance with the strength requirements and other desired properties for the final cured cement as will be discussed in greater detail below. The self-adhesive properties of the wood/paper pulp as well as the fiber texture (and, possibly, some penetration of Portland cement into the pulp fibers) tends to increase strength and/or allow a somewhat higher sand to Portland cement ratio to be used and results in stronger cured papercrete (e.g. construction blocks, modular panels and the like) at reduced cost of constituent materials.

However, batches of other sizes or even a continuous mixer can be used. These ingredients are then mixed until the sand reduces the paper to a pulp having the desired consistency and fiber characteristics as illustrated at 120. For a nine cubic foot mixer, the proper and preferred consistency with a preferred but non-critical average fiber length of about one-sixteenth inch can be achieved in about fifteen minutes or less, depending on the proportion of sand, as noted above. (Other techniques of pulp preparation such as cutting tend to produce an inferior pulp having shorter fiber length.) It is expected that use of larger capacity or continuous mixers would achieve the desired consistency in a shorter time, as well. The pulp is then dried, as illustrated at 130, to a water content which is below that which can cause onset of a curing reaction in Portland cement which will be added to the dry mix at a later point. A commercial drier may be used but simply air drying with solar heat is currently preferred. Adequate dessication of the pulp can be determined by weight which approaches the original weight of dry paper and sand or desired weight of paper and sand upon removal of excess sand (e.g. to about eighty pounds for thirty pounds of wood/paper) although other testing methods may be employed.

Figure 1B:
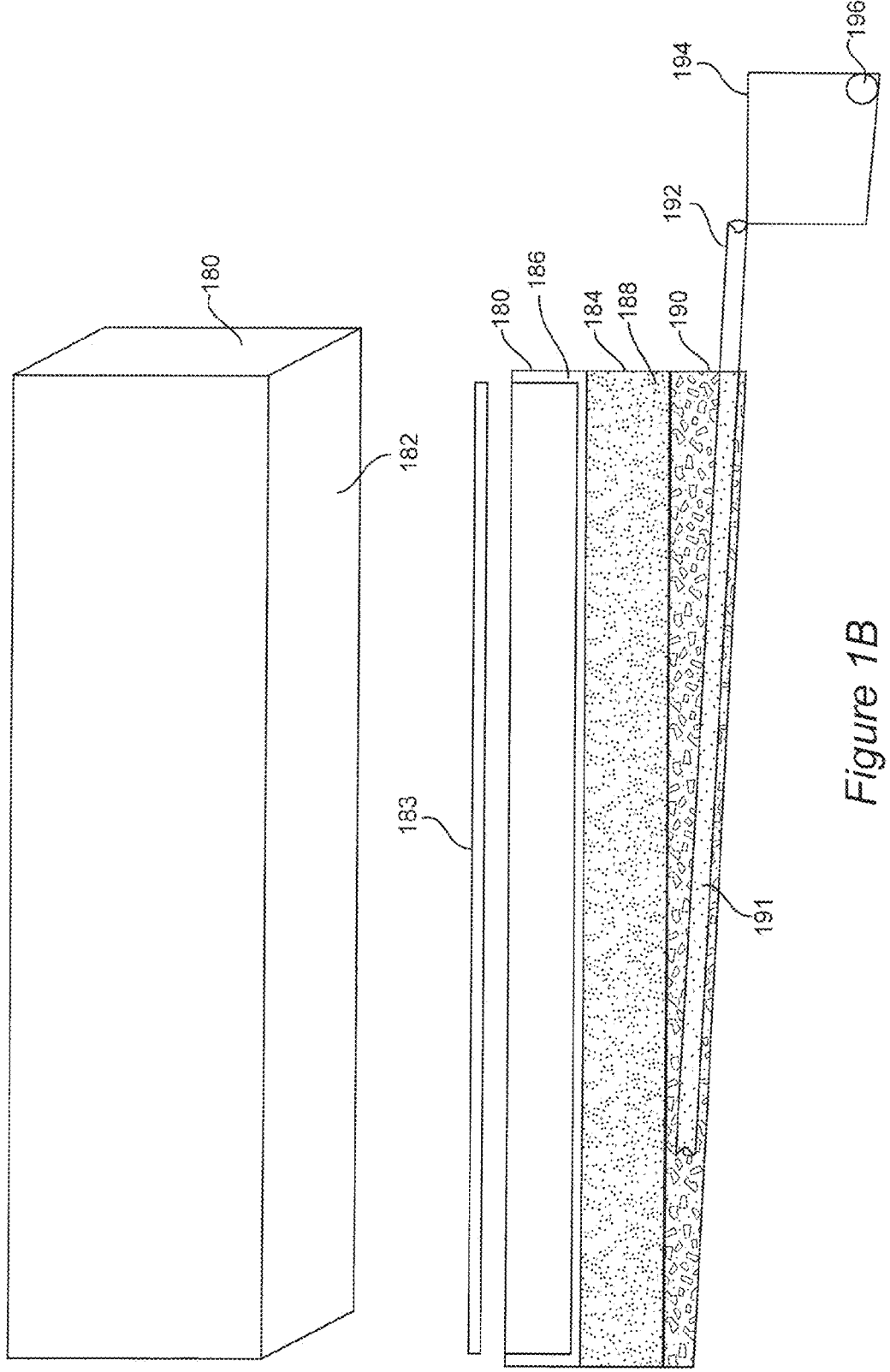
FIG. 1B is a cross-sectional view of an apparatus useful in preparation of the dry wood/cellulose/paper fiber component of papercrete in accordance with the invention.

A preferred drying apparatus is illustrated in FIG. 1B. It is preferred to provide a moveable box 180 for holding the wet sand an pulp mixture once the pulping process is completed. This box preferably has solid wood or metal sides and a bottom 182 formed of a layer of expanded (or otherwise perforated) metal sheet which provides support for a filter cloth 186 or, preferably, a wire mesh screen having a mesh size of about one-eighth inch to allow egress of excess sand. The height of sides of the box 180 is not critical and a height of six to eight inches is preferred.

The box 180 is preferably sized to fit upon and be supported by a frame 184 which will serve to catch and hold excess sand that may separate or be separated from the sand and pulp mix. The frame 184 preferably includes a lower portion 190 having an inclined bottom which is preferably filled with pea gravel covering a perforated tube 191 allowing water to drain from frame 184. The pea gravel can also be covered with a layer of sharp concrete sand to allow water to easily percolate therethrough and may include one or more layers of filter cloth to limit sand incursion into the pea gravel.

In use, the wet sand and pulp mixture would be loaded into box 180 either before or after it is placed on the frame 184. A pressure plate is preferably applied to provide some mechanical squeezing of moisture from the sand and pulp mixture. The water thus drains into the frame 184, possibly carrying excess sand, which passes through screen 182, filter cloth 186, sand layer 188 and pea gravel 190 and into perforated tube 191 and passes through tube 192 to be collected in a trough or tank 194. The water may then be recovered using a recovery pump 196 and the recovered water used in further pulping of additional wood/paper as described above.

Further drying of the sand and pulp mix can be achieved by blowing or drawing air therethrough within the box or simply by evaporation and percolation after removal of the pressure plate. The box may also be removed from the frame at this point and placed in a location or environment where drying will be facilitated (e.g. by sunlight or applied heat and/or natural or forced circulation of air). Again, adequate drying can be determined by weight or other instrumentation which is well-known in the art and can generally be achieved in a very few hours. Excess sand can be removed by shaking or vibrating the box 180 or stirring the sand and pulp mixture before and/or after removal from frame 184.

It should be noted that the above process provides for greater control of fiber qualities than if a wet mixture of papercrete suitable for immediate application were being prepared since additional grinding of the fibers would occur during further mixing with additional sand or gravel and Portland cement. The fiber qualities achieved by the above process may, however, be maintained by using the novel application technique made possible by the dry papercrete mix application methodology in accordance with the invention, as will be described below.

It should be understood that while the above preparation of paper or cellulose pulp is preferred as being of relatively low cost and convenient for the preparation of papercrete mix in relatively small batches, other methods of fiber preparation may be preferable for pulp preparation in larger batches or continuous processes or where avoidance of drying time is important. For example, the pulp preparation can be rapidly performed in a single or double hammer mill to obtain the desired fiber consistency as discussed above without application of water to the paper or paper products; thus eliminating any need for a drying process. If a hammer mill is used without wetting of the paper, no clumping of the pulp is likely to occur and the breaking of the clumps which will be described below in two alternative processes will not be necessary. However, the alternative processes that will be described below may remain desirable for the processing of other ingredients as they are added to the dry papercrete mix and, if such further processing is performed, that processing should be considered in determining the degree of initial grinding of the paper to be performed since some further grinding of the paper will occur in the processing as additional ingredients are added as well as when a wet mix is formed by mixing processes known for mixing concrete.

In this regard, the use of sand in grinding the cellulose/paper pulp is not desirable other than for a very short period of time since processing of sand in a hammer mill will decrease its "sharpness" and compromise adhesion with Portland cement as well as causing wear and requiring additional maintenance of the hammer mill. However, addition of the desired amount of sand to adhere to the paper pulp for a very short period at the end of the pulp grinding process may be tolerable and desirable. However, in contrast to sand, the addition of waste glass that will pass through a 2 mm mesh screens can be added for a longer period of time or for the entirety of the pulp grinding process. If 2 mm screened waste glass is added and processed with the pulp in the hammer mill, substantial adhesion to the pulp particles will be achieved as well as grinding or crushing the glass to a smaller particle size that maintains the sharpness of the surfaces thereof; both of which appear to increase the adhesion with Portland cement and paper pulp. By the same token, the continual renewal of the sharp surfaces of the waste glass as it is further processed in a hammer mill contributes to the rapidity of the pulp grinding process. Wear on the hammer mill is likely to be somewhat less than with sand when processed for comparable periods of time since glass has an amorphous structure while sand is substantially crystalline or polycrystalline such that while sand and glass have comparable strength in compression amorphous glass particles can be more easily broken than crystalline or polycrystalline sand particles.

At this point, either of two further processes may be employed which yield similar but subtly different qualities in the dry papercrete mix. Therefore, while either process will produce a dry papercrete mix suitable for most applications, one process may be preferred over the other for particular applications or in dependence on the availability of some materials.

In one of these processes the dried paper pulp or pulp and sand mixture is pulverized as shown at 140. Then additional sand and/or equivalent volume of ground pumice or 2 mm screened waste glass and Portland cement is added as shown at 145 and 150, respectively. Total sand/pumice/waste glass (e.g. in the pulp and the additional sand/pumice/waste glass) should be in the desired proportion to the amount of Portland cement added at this point. That is, the relative amount of fiber can vary widely while obtaining some or all of the advantages of including dry paper pulp, possibly including additional sand/pumice/waste glass, to ordinary, commercially available dry concrete mix formulations and will be discussed in greater detail below. Preparation and packaging of such additives in volumes or weights corresponding to commercially available quantities (e.g. bags) of dry concrete mix is considered to be within the scope of the present invention. However, for general applications, an additional 150 pounds of sand and 94 pounds of Portland cement would be added to approximately eighty pounds of dry fiber and sand/pumice/glass pulp produced as described above. These dry ingredients are then mixed thoroughly and placed into moisture-resistant bags or otherwise stored for future distribution and use; preferred methods of which will be discussed below.

In the other of these processes, additional sand and/or pumice stone (preferably of a one-quarter to one-half inch diameter) and/or screened waste glass is added to the dried pulp and sand mixture and that resulting mix is pulverized as illustrated at 160 and 165, respectively. Portland cement can then be added and mixing and bagging/storage operations 170, 175 performed as discussed above.

It should also be noted in this regard that the use of pumice stone or ground pumice is essentially a filler which is generally of lower cost than sharp sand and is not generally preferred but for that reason. It has been found that pumice granules can flake or dislodge fairly easily and thus pumice content does not provide adhesion properties equal to those of sharp sand either within the cured papercrete or for surface finish materials such as stucco. The reason for this tendency is not known but may be due to a mismatch between the preferred fiber length and pore size of the pumice. These effects of pumice inclusion can be significantly ameliorated by grinding the pumice to a smaller particle size approaching a powder. Therefore, papercrete mixes with a smaller filler particle size such as that of sharp sand and/or screened (and possibly further ground) waste glass) appear to provide a final product with best advantages over concrete. Nevertheless, replacing all or part of the additional sharp sand with pumice stone or ground pumice (e.g. without waste glass) yield a satisfactory product for many structural applications but waste glass inclusion is preferred, for most if not all applications.

It should be noted that processes 140, 145 and processes 160, 165 are in essentially the reverse order and processes 160, 165 may use pumice stone whereas processes 140, 145 may use ground pumice. Thus, one or the other of these processes may be preferred based on the availability of either pumice stone or ground pumice. Also, process 160 may be preferred for developing a more uniform grain size in the final mix which may have an effect on the density or finish of the papercrete when applied and cured although process 140 may be preferred to produce lower density and/or a surface texture to which other finish materials may better adhere. Process 140-155 may also be preferred when the addition of gravel is desired that might otherwise interfere with pulverizing process 165. However, gravel can be added to the dry mix subsequent to step 165. In this regard, use of gravel is not preferred since, being stone, it tends to diminish the advantages of papercrete over concrete since adhesion of the ingredients of the papercrete is compromised. However, such deleterious effects can be largely avoided by using so-called pea gravel in relatively small quantities.

It should be understood that the foregoing description of a dry application papercrete is somewhat generalized, as is appropriate to an explanation and description of a basic formulation of the dry papercrete mix in accordance with the invention and its basic principles. However, it should also be understood that many variations of such a dry papercrete mix are possible and advantageous for particular applications. Many variations with additional or substituted constituent materials can be employed to provide for substantially optimal properties of cured papercrete after mixing and casting into desired shapes for various applications and products useful in construction and other fields.

It should also be appreciated in the following discussion of such variations of the basic formulation that, in general, it is preferred to consider proportions of major ingredients by dry volume relative to a weight of 94 pounds of Portland cement which has a dry volume of one cubic foot and is a standard packaging weight of that material. Other major ingredients should generally be in a proportion of about four to five cubic feet of dry volume to one cubic foot of Portland cement to result in a batch size of five to six cubic feet which generally corresponds to the capacity of a nine cubic foot capacity mixer. Thus, it is often convenient to consider the basic formulation in terms of dry volume, particularly since some of the substitutions for filler material involve materials of a density that varies greatly from the density of sand and result in cured papercrete of advantageously reduced weight and increased thermal resistance, although the weight of constituent ingredients will be given below. It will also be noted that the relative amounts of some major ingredients will vary by a factor of two between various formulations that will be discussed below which is basically an incident of considering proportional content in terms of dry volume. Incidental ingredients such as wetting agents and the like that do not contribute significantly to final volume of dry or wet papercrete mix are simply added as a small volume measure to a basic batch quantity that will provide about six cubic feet of dry mix or six and one-half cubic feet of wet mix (due to expansion, particularly of the fiber content, when water is added).

Cellulose pulp, prepared from paper or paper products as discussed above, is an ingredient of virtually all products made in accordance with the invention although the proportion of cellulose pulp in the dry or wet mix can be varied over a wide range to vary the properties of the resulting papercrete material. For footings and foundations to support large structures, cellulose/paper pulp is preferably omitted altogether but the addition of screened waste glass to traditional and commercially available dry or wet concrete formulations appears to provide some strength enhancement and is considered to fall within the scope of the invention. In general, increased proportions of cellulose pulp reduce the density and weight per unit volume and increase the thermal resistance and insulating properties of the cured papercrete material. The ability of the papercrete to hold fasteners such as nails and screws and facilitate their attachment to cured papercrete is enhanced by increased cellulose/paper pulp up to about ten pounds per fiver cubic feet and to decrease with increased cellulose/paper pulp content above thirty pounds per five cubic feet with a maximum between those approximate proportional content levels that varies with other ingredients. However, some decrease of both compressional and tensile strength is observed with increasing proportion of cellulose/paper pulp.

Wood particles of varying size from sawdust to wood shavings or chips of up to several inches across can also be used as filler for papercrete as a substitute for sharp sand. Suitable particles can be formed as a by-product of woodworking or be created by chipping or grinding discarded wood such as wood pallets, tree limbs and sawmill waste such as bark layers sawn from logs in making dimension lumber. Such particles generally have a very rough, irregular and porous surfaces and Portland cement and other cement products generally adhere to wood chips and sawdust particle to a degree comparable to adhesion to sharp sand. As a filler, relatively large proportions of such wood particles can greatly decrease the cost and weight/density of cured papercrete while greatly increasing thermal resistance.

Another material that has several beneficial effects on cured papercrete properties is exploded straw and other straw materials. Exploded straw is prepared by placing straw in a pressure vessel and raising the pressure to a high pressure of several hundred pounds per square inch (e.g. 500 psi). After pressure has equalized on the inside and outside of the straw fibers, the pressure is released from the pressure vessel as rapidly as possible; causing the individual straws to explode and produce fibers that can be further cut or pulverized as may be desired for a particular application. In a dry papercrete mix, inclusion of straw or exploded straw can enhance the diffusion of water during application. In cured papercrete, inclusion of straw can enhance both tensile and compressional strength somewhat as well as reducing weight and increasing thermal resistance when substituted for a portion of sharp sand. As the proportion of straw in a wet or dry application papercrete mixture is increased, the thermal resistance is substantially increased although compressional strength will be reduced. A degree of cost reduction can also be achieved although straw is not usually a waste product (unless recovered after other uses) and preparation of exploded straw carries some additional costs for manufacture.

Waste glass, alluded to above, can also be used as a substitute for some or all of the sharp sand in either wet or dry application papercrete. Suitable glass particles are preferably prepared by crushing waste glass until the glass particles can be passed through a 2 mm screen. Such crushing develops highly irregular surface on the particles for good adhesion with Portland cement and other cement products as well as a substantial proportion of very much smaller particles to which other papercrete ingredients adhere very well. The highly irregular surfaces and sharp edges also make waste glass suitable for preparation of cellulose pulp as described above and adheres to the pulp to a substantially identical degree. The average particle size is somewhat larger than grains of sand and may enhance compressional strength of the cured papercrete.

Sharp sand such as so-called concrete sand or mortar sand is used as a filler material to reduce the amount of Portland cement or other cement materials required for a given volume of cured papercrete. While other fillers may be substituted for all or a portion of the sand in a wet or dry application papercrete mix, exclusive use of sand as filler will provide greatest density and compressive strength.

Lime can be added to either a wet or dry application papercrete mix. The addition of lime can enhance the curing reaction of Portland cement and reduce curing time. Added lime can also improve surface finish qualities of cured papercrete and increase the amount of time the uncured material can be worked (e.g. with a trowel) when used for mortar. Adhesion of uncured papercrete to cured papercrete and other building materials is also somewhat enhanced by the addition of lime.

Portland cement has been discussed above as an ingredient for wet or dry application papercrete mix. However, Portland cement is expensive and constitutes the largest cost component of a wet or dry application papercrete mix or cured papercrete product; requiring, as a practical matter, the use of a substantial quantity of filler material as discussed above. A suitable alternative for a portion or the entirety of Portland cement in a wet or dry application papercrete mix is Pozzolana (sometimes spelled as Pozzuolana, in reference to an early source of the material near Naples, Italy) which is a volcanic ash containing silica and alumina and sometimes lime and other minerals. In a manner somewhat similar to Portland cement, when a very finely powdered Pozzolana is wetted in the presence of a small amount of lime, a chemical reaction occurs to form calcite, generally in an interlocking network of crystals, to form a light and porous stone similar to volcanic tufa that results, over time, from volcanic eruption that deposits large amounts of ejecta. However, this curing reaction is generally very slow since carbon dioxide is required by the reaction and ambient concentration in the atmosphere is relatively low any only slowly permeates Pozzolana powder. Therefore, while Pozzolana was used as a cement in ancient times, current uses for Pozzolana have generally been limited ingredients for hydraulic cement or the like which is applied as a wet mix under pressure.

However, in accordance with a perfecting feature of the invention which is not necessary to the practice thereof in accordance with the basic principles thereof, it has been found that a mixture of lime and Pozzolana in an ratio of approximately of one part lime to three parts Pozzolana by dry volume can be substituted for the combination of Portland cement and sand. While the curing reaction is slower than that for a Portland cement mixture, speed of curing can be increased substantially by using carbonated water for wetting the Pozzolana and lime mixture. The calcite formation in Pozzolana essentially replaces the hydration/curing reaction in Portland cement while the silica, alumina and mineral content of the Pozzolana essentially replaces the sand. The curing reaction speed can be further enhanced by the addition or a small amount of Portland cement to the Pozzolana and lime mixture.

Among the incidental ingredients alluded to above, ordinary laundry soap or detergent powder is preferred to provide improved wetting of the particles of the principal ingredients of the dry or wet application papercrete mix in accordance with the invention. Dry soap or detergent powder can be included in the dry application papercrete mix or liquid soap or detergent can be added during mixing the dry mix with water or can be mixed with the water as the water is applied to dry application papercrete mix in a mold as discussed below.

Caustic soda is also a preferred incidental ingredient to raise the pH of the wet papercrete mix, particularly when straw or exploded straw is included as alluded to above. When caustic soda is added to a wet papercrete mix containing straw, the lignin in the straw breaks down to form a glue-like substance that improves adhesion of the particles of the other ingredients and the cellulose of the straw during the curing of the papercrete and increases both compressional and tensile strength of the cured papercrete.

The above discussion of the variations in the properties of cured papercrete that can be achieved with additional materials and/or altered proportion of possible ingredients will enable those skilled in the art to customize wet or dry application papercrete mixes which are particularly appropriate to given applications. For example, in regard to building materials, different papercrete formulations would be appropriate to different portions or components of a building structure since different properties have different relative advantages in different building components. Some exemplary papercrete formulations for building components and materials will now be discussed and compared.

For floors that must bear substantial loads, a preferred formulation is 7.5 pounds of cellulose/paper pulp, 94 pounds Portland cement, ¼ cup dry laundry soap and 500 pounds of sharp sand is preferred. The above substitution of Pozzolana and lime can be substituted for all or a portion of the Portland cement and/or sand. The high sand and Portland cement content increases density and compressive strength and reinforcement can be added for tensile strength as needed or appropriate. Relatively reduced soap content minimizes compromise of adhesion of particles in the mix and maximizes tensile strength. The cellulose/paper pulp content, while relatively small, is sufficient to provide advantages over cured concrete as discussed above.

For exterior walls, two alternative mixes are preferred. For maximum strength, 30 pounds of cellulose/paper pulp is mixed with 94 pounds of Portland cement, ½ cup of dry laundry soap and 400 pounds of sharp sand. A mixture of Pozzolana and lime can be substituted for a portion or all of the Portland cement and sand. Again, the high sand content leads to a high density while the relatively increased cellulose/paper content increases thermal resistance. As an alternative formulation where thermal resistance is of increased importance relative to strength, 30 pounds of cellulose/paper pulp is mixed with 94 pounds of Portland cement, ½ cup of dry laundry soap, 50 pounds of wood chips or sawdust and 100 pounds of sharp sand. This alternative formulation provides greatly increased insulating qualities and reduced weight without unduly compromising strength. Note that 300 pounds of sand are replaced by only 50 pounds of wood chips/sawdust relative to the other wall formulation. In both wall formulations, increased proportion of dry soap increases the flow characteristics of the wet mix to, for example, improve filling around reinforcing materials and provides a better surface finish compared to the mix preferred for floors.

Figure 7:
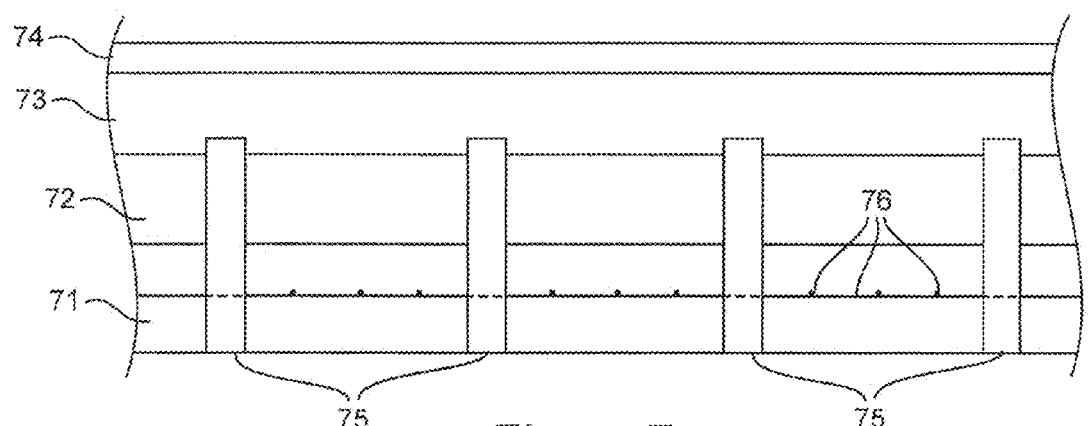
FIG. 7 is a cross-section of a preferred construction of a roof structure in accordance with the invention.

For roofing, a four layer construction is preferred; a cross-section of which is shown in FIG. 7 in which the four papercrete layers 71-74 are applied between 2"×12" joists 75 (or other dimensions appropriate to the span) with ½ inch reinforcing bar 76 installed three inches from the bottom of the joists. The papercrete material of the third and fourth layers extends above the top of the joists.

The preferred formulation for the lowermost or first layer 71 is 15 pounds of cellulose/paper pulp mixed with 94 pounds of Portland cement, ⅓ cup dry laundry soap, 50 pounds of wood chips/sawdust and 100 pounds of sharp sand. The substitution of Pozzolana and lime for a portion of the Portland cement and sand (e.g. to the extent of the sand content) is satisfactory. A four inch thickness is preferred. The relatively high content of Portland cement assures good adhesion to filler(s) and strengthening by the reinforcing bar(s) while the wood chip/sawdust content greatly reduces weight and increases thermal resistance. This formulation is preferably poured in place and adhesion to the joists together with the extension of the third and fourth layers above the joist substantially enhances the strength and rigidify of the entire structure.

The preferred formulation for the six to eight inch thick second layer 72 is 30 pounds of cellulose/paper pulp, 47 pounds Portland cement, ½ cup soap, 8 pounds straw or exploded straw and 50 pounds hydrated lime. Pozzolana may be substituted for the Portland cement without necessarily increasing lime content. The reduced amount of Pozzolana or Portland cement is entirely sufficient for an internal layer core of a roof element while strength and thermal resistance are increased by the inclusion of straw and/or exploded straw. A thermal resistance value of 3.6 to 3.9 has been computed for papercrete using this formulation. Densities as low as 3.0 to 5.0 pounds/cubic foot have been achieved using this formulation.

The preferred formulation of the third layer 73 which is preferably four inches thick is 30 pounds of cellulose/paper pulp, 94 pounds of Portland cement, ½ cup laundry soap, 50 pounds of wood chips/sawdust and 100 pounds of concrete sand. This formulation differs from the formulation of the first layer by inclusion of cellulose/paper pulp for lightness and increased thermal resistance and additional dry laundry soap which improves flow to decrease the likelihood of holes or voids particularly where papercrete covers the joists while any possible compromise of strength is relatively unimportant since the third layer will be reliably in compression.

The fourth layer 74 which is preferably only about one-half inch in thickness is preferably formulated as 7.5 pounds cellulose/paper pulp, 94 pounds of Portland cement, ¼ cup dry laundry soap and 400 pounds of screened sharp sand. Substitution of Pozzolana and sand is functionally adequate for this layer but is not preferred since Pozzolana is somewhat porous and does not provide a desirable surface finish. The increased density due to increased sand content is desirable for high compressive strength and stiffness but does not significantly increase overall roof weight since the fourth or top layer is thin.

A preferred formulation for mortar mix is 7.5 pounds of cellulose/paper pulp, 94 pounds Portland cement ¼ cup dry laundry soap and 400 pounds screened sharp sand. Substitution of Pozzolana and lime is suitable for laying cured papercrete blocks in courses such as is conventional for uses of concrete blocks or bricks but may not be suitable for covering joints between floor, wall and/or roof modules as will be discussed in greater detail below. The cellulose/paper pulp content is relatively reduced to reduce swelling and shrinkage with change in water content but is generally sufficiently matched to expansion/contraction characteristics of other cured papercrete. The cellulose/paper pulp content can be adjusted as needed in this regard. The high density due to the high sand content can support large loads of stacked construction modules. The same formula with or without coloring agents can also be used for plaster since a desirable surface finish can be developed and this formulation has good adhesion characteristics.

The dry papercrete mix as produced by the above method and having constituent materials and proportions as discussed above or varied between or extrapolated from the preferred formulations may now be handled and distributed in exactly the same manner(s) as now employed for dry concrete mixes. Moreover, it can be mixed with water and applied in precisely the same ways well-known for the mixing and application of concrete. However, it also provides the distinct advantage of being capable of dry application which is much simpler, more economical and safer than methods which are known for concrete.

Figure 2A:
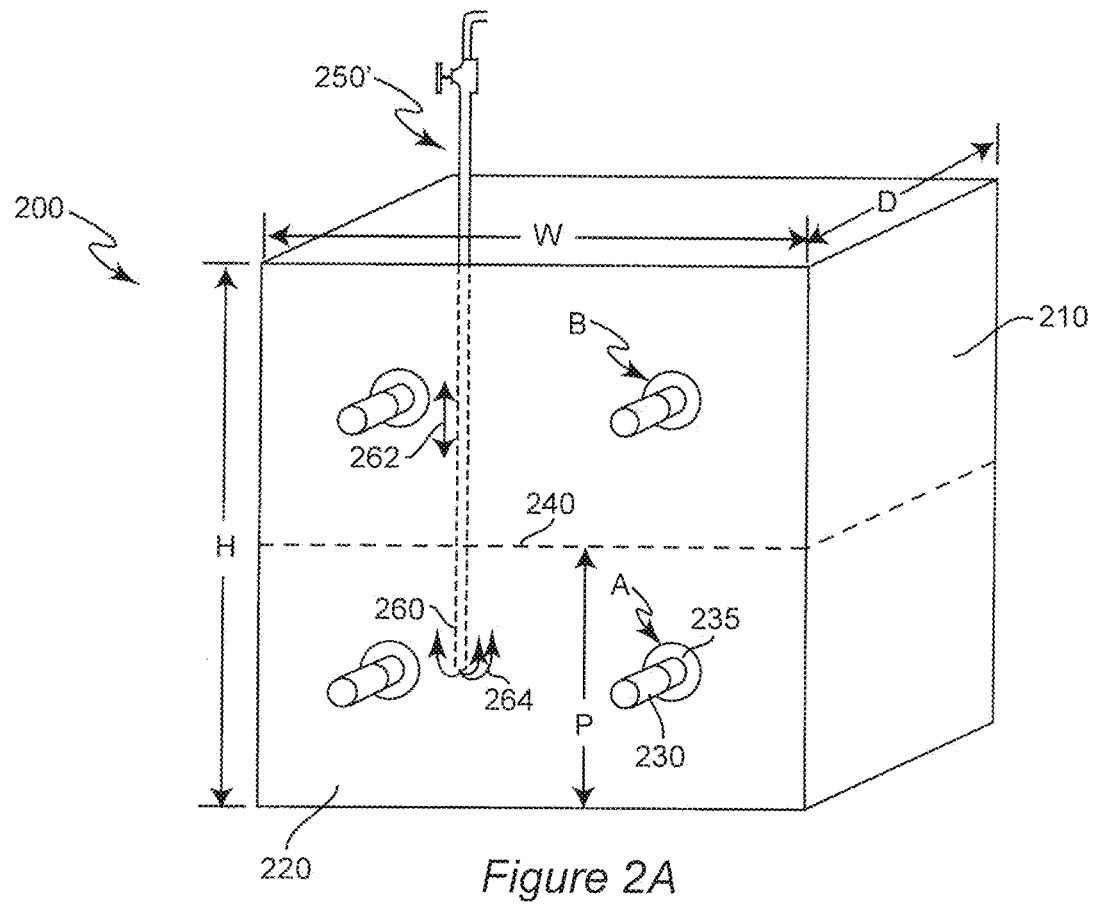
FIGS. 2A and 2B are isometric depictions of a form and other equipment, respectively, which are particularly advantageous for application of the concrete composition in accordance with the invention which also illustrate a method of dry papercrete application in accordance with the invention.
Figure 2B:
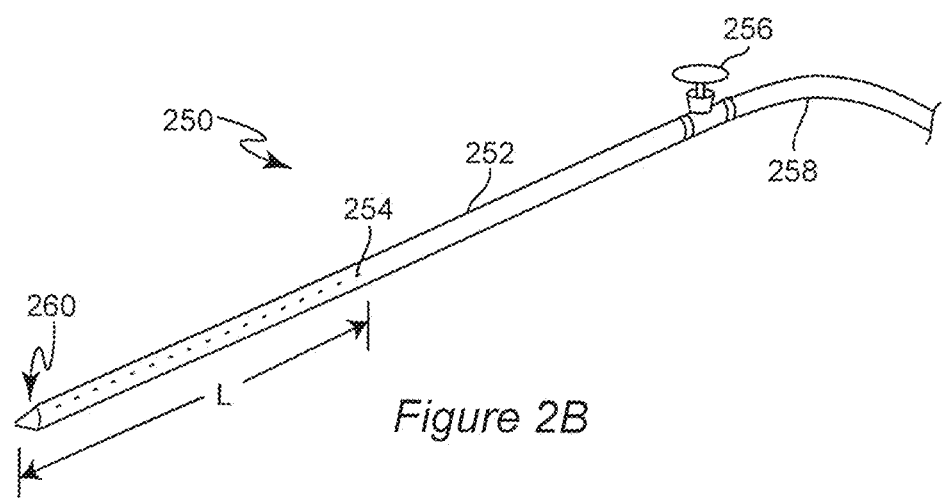

Specifically and with reference to FIG. 2A, an exemplary casting mold is shown which is suitable for casting, for example, a wall section for a structure is shown. preferred dimensions of a structural module are a four foot by eight foot panel having a thickness of about one foot. Such panels can be cast either horizontally or vertically with vertical casting being somewhat more convenient for in-situ casting and horizontal casting allowing internal structures such as reinforcement, wit=ring heat transfer fluid circulation and the like structures to be accurately positioned. Other shapes can also be employed and the size is not at all critical to the practice of the invention. However, for casting a wall panel, a thickness or inside dimension D is preferably about one foot although some tapering may be desired which would preferably be achieved by increasing dimension D at the bottom of the form. Width W is immaterial to the practice of the invention but was about four feet for casting of the wall panel shown in FIG. 3. In this regard, either or both end panels can be omitted and effectively replaced with a previously cast section of the structure or another structure to increase integrity therewith as will be apparent to those skilled in the art. Height H is not critical to the successful practice of the invention but should be chosen as at least twice the depth of a single papercrete "pour" (possibly a misnomer as will be evident from the discussion below although the term is used herein as a parallel process to known concrete forming processes for which the term is more appropriate and well-established in the art) that can be contained by the material and construction of the mold against the pressure of the papercrete within the mold. This exemplary mold was made of ⅝" plywood which can easily withstand pressures developed by a two foot depth of papercrete, particularly when reinforced with rods 230, in this case conveniently formed by pipes, which extend through front and back panels 220 and which carry clamps 235 which can bear against panels 220 to resist the outward pressure of the papercrete as it sets and cures to maintain papercrete thickness substantially as desired.

Using such a mold, the dry papercrete mix can be applied in a dry manner by simply pouring the dry mix into the mold, assembled as shown, filling the mold to approximately the level indicated by dashed line 240. (Any desired reinforcement or provision therefor can be laid in place as or before the dry mix is charged into the mold. A dry mildewcide or mold inhibitor can be introduced at this point if desired and not included earlier in preparation of the paper pulp.) No separate mixing with water is required at this time. Water may then be applied using an apparatus 250 such as that illustrated in FIG. 23 comprising a tube or pipe 252 of convenient length (e.g. somewhat longer than H) having a preferably pointed cap and having holes therein over a length L of the distal end thereof which approximates the anticipated depth of the pour, P. The apparatus is preferably equipped with a fitting to connect to a water supply such as hose 258 and a water control valve 256. A continuous flow mixer such as those used for adding fertilizer to irrigation water may also be employed to add a colorant, mold suppressant, mildewcide or any other incidental material desired to the dry papercrete mix during the wetting process. Such an apparatus is thus similar to a so-called root feeder used to apply liquid fertilizer or other materials to plants at a depth below the surface of the soil. Such a commercially available root feeder can, in fact, be used in the practice of the invention but an apparatus having length L specific to pour depth P is deemed preferable for producing a more uniform distribution of water with less vertical movement than would be required to achieve a similar distribution of water in the papercrete mix using a root feeder.

After the dry mix is loaded (hence "pour" may be a misnomer) into mold 200, preferably including application of some vibration to more densely settle the dry mix and to avoid voids (which requires specialized devices to achieve the same effect with a wet mix), apparatus 250 can simply be inserted into the dry mix in the mold (preferably beginning near a corner of the surface of the dry mix) and water applied at sufficient pressure by opening valve 256. The amount of water is not critical and can be determined by inspection since the water will be absorbed more readily by the paper/wood pulp and be distributed through the dry mix radially around the apparatus. When the water so distributed reaches into a corner or a wall of the mold, the water can be turned off at valve 256, apparatus 250 withdrawn and reinserted at another location in the dry mix and water again applied. No voids are formed by the withdrawal of apparatus 250 since the mix will be most wet and will flow most readily where water has been applied although the wicking effect of the paper pulp will rapidly make the water distribution quite uniform thereafter. This process is repeated, preferably in some logical pattern, until water has been applied to the entire volume of dry mix. It is also preferred at this point or up to three to four hours later to tamp down the edges of the mix to further compact the papercrete mix.

While the particular adaptations discussed above in connection with apparatus may seem ideal, the inventor has found that somewhat superior performance of the wetting process for the dry papercrete mix can be achieved with a substantially simpler apparatus which is simply a piece of pipe or tubing of convenient length which is open at the end 260, omitting peripheral holes 254. A one-half inch nominal diameter of the tube is preferred for use in connection with a mold and "pour" of the scale described above but other sizes may be used for other applications. Such an embodiment is shown at 250' of FIG. 2A. With such an apparatus, the flow of water at a preferred pressure of thirty to forty-five psi may be continuous during the wetting process. The water flow from the end 260 of the apparatus at such a pressure will displace and more thoroughly mix particles of the dry papercrete mix as generally indicated by arrows 264 in FIG. 2A and allow the apparatus 250' to be simply plunged repeatedly with little force into the dry papercrete mix and withdrawn (as indicated by double arrow 262) in accordance with some systematic pattern to provide coverage throughout the dry papercrete mix while accommodating any reinforcement structures that may have been applied. Water discharged on top of the papercrete mix, if not excessive, is of generally salutary effect in properly hydrating the papercrete. Additionally any need to apply vibration to the dry papercrete mix to settle it, as described above, especially around any reinforcement structures that may be included, is avoided and any differential settling of components of the dry papercrete mix are substantially or fully counteracted by the additional agitation provided by the water flow.

It should be appreciated that the preferential absorption of water by the paper/wood pulp avoids any need to separately mix water with the dry mix in the manner that is conventional for concrete prior to application to the mold or otherwise applied. By the same token, the technique described above can be used instead of such "normal" mixing if, for example, the papercrete is to be applied for filling of holes or forming horizontal structures such as paved surfaces or applied with a trowel or the like. It should also be appreciated that the preferential absorption and distribution of water throughout the mix makes the amount of water applied substantially less critical than with concrete mixes and retains water throughout the body of applied papercrete to enhance curing. (Portland cement can be observed adhering to the paper pulp in the dry mix and such adhesion may be enhanced as water is distributed by wicking through the pulp.) With known concrete mixes, excess water tends to escape the mold while carrying Portland cement with it. Very little Portland escapes from the wetted papercrete mix even if excess water is applied. It is preferred to apply water to the point of forming a puddle of shallow depth on top of the wetted dry mix. The water in the puddle will protect the surface from drying prematurely (and interfering with the cure) while providing a small reservoir for water to be further distributed to the remainder of the papercrete by the wicking action of the paper pulp.

In this regard, application of the above formulation with a trowel is considered to be less than ideal and it is believed that a lower paper/wood fiber concentration, as discussed above, would improve wetted papercrete mix for trowel application. Further, for hole filling or forming any generally horizontal structure that may require strength very similar to that of concrete, addition of dry paper/fiber and sand pulp prepared as described above in a concentration of as low as 3% to 5% by weight will allow the dry application of conventional dry concrete mixes using in-situ wetting as described above. Both of these possible variant formulations are considered to be within the scope of the present invention.

After the papercrete is allowed to cure for approximately one day, the cure will not be complete but will be sufficient for a further "pour" to be made by filling the remainder of the mold or form 200 or a lesser portion thereof with dry papercrete mix and applying water with apparatus 250 or 250' as before. The newly applied papercrete is then allowed to cure for about one day.

At this point, the pipes or rods 230 can be withdrawn and the mold moved up until the hole in the mold or form originally at location A registers with a hole in the cast papercrete at location B, at which point a further "pour" can be made as described above. At this point, the papercrete exposed by the shifting of the mold or form has cured for two days and is quite strong but will continue to cure and increase in strength as the mold or form is repeatedly shifted and additional "pours" made. However, depending of the cumulative weight bearing on the base (e.g. due to the cumulative height), it is preferred to allow two days curing time between "pours" which allows additional curing and development of additional strength of earlier "pours" as the overall height and weight of the structure increases. It has been found that subsequent "pours" still adhere very well after two days of curing of previous "pours". Thus, height of the structure can be built up very rapidly with simple and easily performed movement of the mold while avoiding of exposure of the cast papercrete until adequate cure has occurred and adequate strength developed to avoid collapse up to perhaps ten feet or more. Heights of eight feet have been achieved with no indication of possible collapse using only one day curing time between subsequent "pours".

Figure 3:
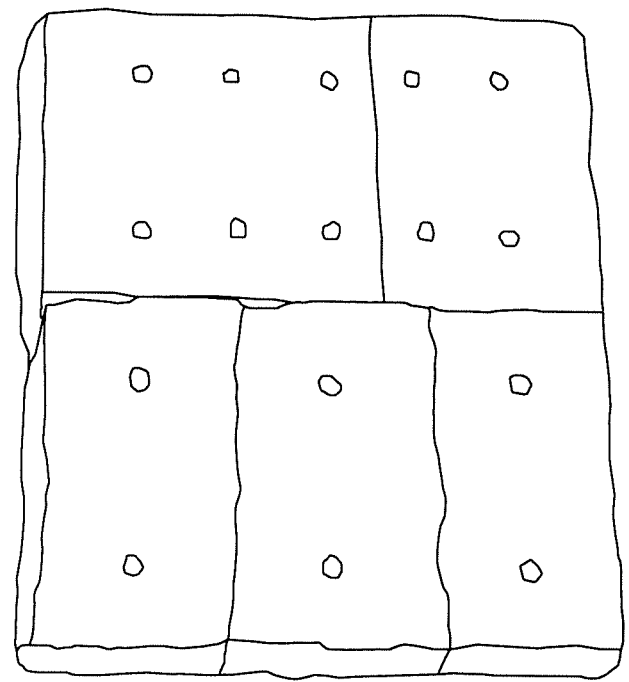
FIG. 3 is a line drawing made from a photograph (originally submitted as FIG. 3) of a concrete casting of papercrete made using the form and equipment of FIGS. 2A and 2B, also included in FIG. 3, FIG. 4A and 4B illustrate a currently preferred form of a portion of a reinforced modular block for assembly into a building structure.
Figure 3:
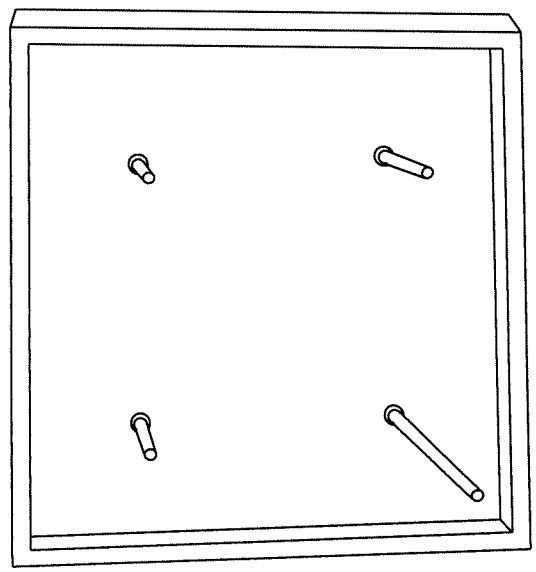

The resulting wall section(s) are shown with the mold used to make them in the FIG. 3. As can be seen, while the respective "pours" can be identified, adhesion between them is quite good. It can also be seen that the depth of each pour is not at all critical to the successful practice of the invention and the spacing of holes for reinforcing rods or pipes 230 (which defines the minimum shift of the mold or form) is similarly not at all critical and may be adjusted to assure a desired cure consistent with good adhesion as height is built up. Note that the wall section on the right has holes spaced more closely and includes one shallow pour immediately above the initial pour. While the wall section on the right required one additional day to form, the initial pour would have cured for one additional day before the mold or form was moved to obtain additional strength to support the fourth and subsequent pours. By the same token, it can be seen that the depth of pours can be adjusted to add smaller increments of weight over time while still keeping the frequency of pours to two days or less for good adhesion.

Further, it can be seen from FIG. 3 that the top surfaces can be left as rough as desired to enhance adhesion to a subsequent pour. Additionally, a wide variety of surface textures can be achieved with different sizes to which the dried pulp and/or pumice are pulverized and different degrees of settling of the dry mix in the mold or form. Therefore, the surface texture and density can be controlled to a substantial degree by slight variation of the molding or forming process.

Figure 4A:
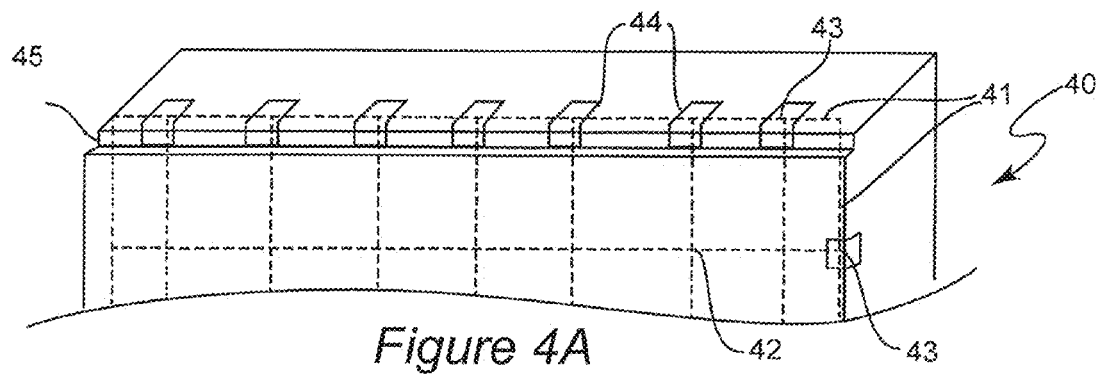
FIG. 4B illustrates a preferred form of reinforcement of a modular block for carrying large and/or shear loads.

As further perfecting features of the invention which are not essential to its successful practice in accordance with its basic principles, reference is now made to FIG. 4A. While inclusion of reinforcement has been alluded to above, the inventor has found it preferable in increasing strength both in tension and in shear (which necessarily includes tension components) to use wire mesh for reinforcement rather than conventional reinforcing rods. In particular, a commercially available product generally referred to as "cattle wire" has been found to be particularly advantageous for both reinforcing structural modules such as those discussed above as well as in assembling such structural modules into a complete structure.

Specifically, "cattle wire" is a welded mesh construction of wires 41 having a diameter slightly less than one-quarter inch that may be woven or simply overlaid and, in either case, welded at the points 42 where wires extending in orthogonal directions cross each other. Spacing of the wires is generally seven to eight inches in one direction and five to eight inches in a direction orthogonal thereto. It should be understood that use of the term "cattle wire" is used herein to describe any wire mesh having the above characteristics and is not intended to limit the invention to the commercial product of that name or referred to by that term.

Figure 4B:
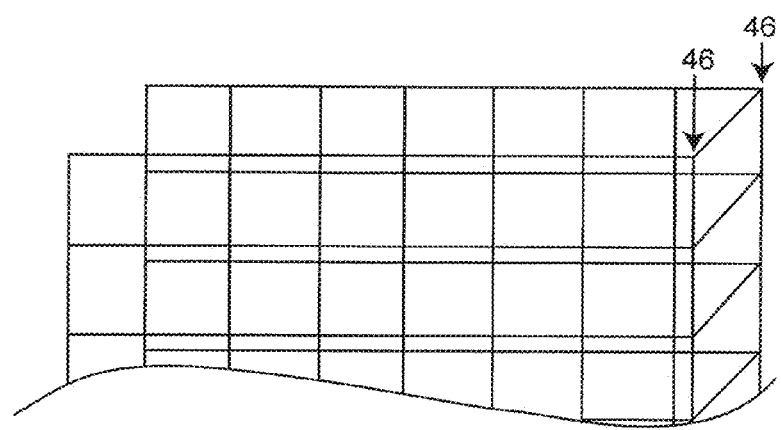

Since the horizontal and vertical dimensions of a mold for manufacturing a structural module as described above is essentially arbitrary (as is the spacing of wires in "cattle wire" if fabricated for use in accordance with the invention rather than using a commercially available product), the mold for a given structural module can be established such that the axis of a wire 41 running parallel to each edge or chosen edges is spaced about one-quarter inch to one-half inch therefrom such that the perimeter of the wire is slightly recessed from the edge of the structural module. This would normally be accomplished by a computer-aided design (CAD) or computer generated modeling methodology including the mesh dimensions of the cattle fence structure as a constraint for the width of individual modules that can then be identified for assembly into a structure of the desired dimensions. A single ply of cattle wire located at about three inches from a face of a structural module (e.g. about three inches from a mold surface) as illustrated in FIG. 4A can be used to reinforce the structural module and will provide sufficient shear strength to withstand very large wind or shear loadings on a structure. However, it is preferred to bend the cattle wire at the location of wires to form a U-shape or box as shown in FIG. 4B to allow symmetrical reinforcement of the structural module and symmetrical joining to adjacent modules.

A notch or recess 43 can be formed in the edge on one or both sides of a structural module and which extends to an adjacent face of the module in order to expose and provide access to a T-shaped portion 44 of the wire mesh at the perimeter of the structural module. Such notches may be of any size sufficient to accommodate a joining fixture such as will be described below or any tool that may be needed to apply such a joining fixture. Alternatively, if the modules are being cast in place, the reinforcing mesh for a "next" module can be attached to the reinforcing mesh of a previous module (which may or may not have been poured) and the mold subsequently put in place and the module(s) poured.

Figure 5A:
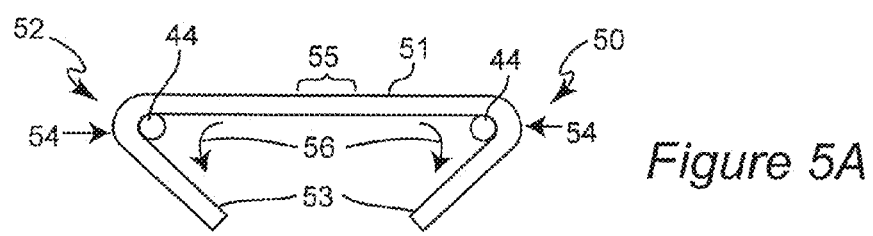
FIGS. 5A and 5B illustrate a preferred form of a fixture for drawing modular blocks close together and structurally joining them.
Figure 5B:
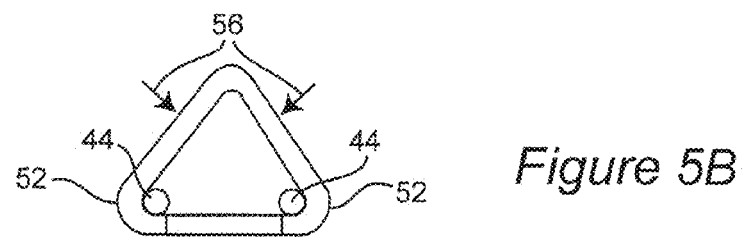

Referring now to FIGS. 5A and 5B, a preferred fixture for drawing structural modules close together while attaching structural modules securely to each other will now be discussed. It should be understood that many other suitable fixtures may be used to achieve similar functions to the preferred fixture. However, the preferred fixture is of extreme simplicity and low cost as well as being commercially available together with tools suitable for its use in connection with the invention.

Specifically, the preferred fixture 50 illustrated in FIGS. 5A and 5B is simply a piece of wire 51, preferably of steel for this application, bent at the ends to form an acute angle with the bends made to provide a curve of small radius, as shown at 52. A similar device where the ends of the wire are sharpened (and usually formed of somewhat softer wire) is known commercially as a "hog ring" and is intended for being affixed to the snouts of swine to discourage digging or "rooting" behavior of those animals. Since hog rings with sharpened ends (and possibly a somewhat softer metal) are completely suitable for practicing this perfecting feature of the invention, the sharpened ends of commercially available hog rings have no function in the context of the invention and the ends are preferably blunt, as shown. Similar structures in various sizes and tools for applying them are currently known and used principally for constructing large wire mesh structures known as gabions that are typically used for containing large quantities of stone or other materials having a sufficiently large size to be contained by the mesh. Tools for facilitating rapid construction of gabions with hog rings are commercially available and suitable for the practice of the invention. The preferred fixture 50 illustrated in FIGS. 5A and 5B will be referred to as hog ring fixtures hereinafter even though it is preferred that the wire ends not be sharpened and the fixture would thus not be suitable for use on swine. The fixtures used for constructing gabions have unsharpened ends and are also referred to as hog rings. Use of the term "hog ring fixture" herein is intended to refer to any wire fixture shaped and functioning as described herein and is not intended to be limited to commercially available devices that may be referred to by that term for use in regard to animals.

The original shape of the hog ring is as shown in FIG. 5A and the distance between the radiused bends 52 is about two inches. For use in accordance with the invention, the hog ring fixture is placed in a tool that resembles large pliers but has cups formed in the inner faces of the jaws to receive the radiused bends when a hog ring fixture is inserted into the tool. The open ends 53 of the hog ring fixture can then be hooked over the exposed wires 44 of the cattle wire reinforcement. When the pliers are squeezed, a compressive force is applied to the radiused bends in the wire at a location which is slightly offset from the axis of the wire between the bends as indicated by arrows 54. The offset from the wire axis, when the force becomes adequately great, causes buckling and further bending of the wire near its center 55; collapsing the hog ring fixture as illustrated by curved arrows 56 and bringing the bends 52 closer together, thus drawing the exposed wires 44 of the cattle wire and the structural modules tightly together and forming a coupling between the structural modules that can carry substantial force in tension.

Figure 6:
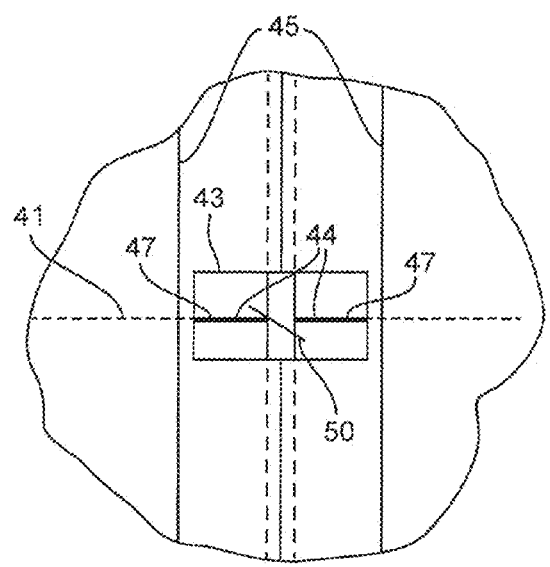
FIG. 6 is a detail of a portion of the joining of two reinforced modular blocks of FIG. 4A using the fixture of FIGS. 5A and 5B.

A detail of the resulting coupling of structural modules is shown in plan view in FIG. 6. The exposed T-shaped portions 44 of cattle wire 41 are visible within notches 43. These exposed portions are drawn together and joined by hog ring 50 which is preferably applied across opposite sides of the respective T-shaped portions 47 so that the hog ring fixture 50 will be consistently located adjacent to portions 47 to deliver tensile force thereto rather than in a location likely to cause a bending moment in another portion of the exposed cattle wire. Additionally, a recess 45 can be provided that forms a groove when two structural modules are joined together as described above. This groove can then be filled with mortar or plaster, preferably formulated as described above to make a smooth continuous surface across the joint.

It should be appreciated that while such joints provide substantial shear strength to an assembly of wall panels, the hog ring fixtures or other fixture having a similar function can also be used to join roof modules and/or floor modules to wall panels. Wherever such joints are formed, the use of hog ring fixtures or the like provide a pre-tensioning of the reinforcing cattle wire mesh which serves to pre-load the papercrete in compression. Such pre-loading thus provides a highly rigid, strong and stable construction that can withstand high wind shear forces far better than most other forms of construction and does so at a substantially reduced cost.

In view of the foregoing, it is clearly seen that the invention provides a dry mix papercrete product that can be stored, distributed and used at least as easily as known and commercially available dry concrete mixes; allowing the properties of papercrete to be obtained as easily as storage, distribution and use of concrete which does not possess those properties. Moreover, a dry papercrete mix allows a technique of dry application which is substantially easier than techniques applicable to concrete and provides superior papercrete qualities to those obtained when conventional concrete application techniques are used. Additionally, the adhesion of plaster, stucco or the like is excellent and no lath or screening is required. The cured papercrete accepts nails and screw-type fasteners well at much lower forces than for cured concrete and retains them well. Further, the thermal resistance or "R factor" for dry application papercrete in accordance with the preferred formulations discussed above is about 2 per inch but more usually above 3 per inch and possibly as high as 3.6 to 3.9 per inch in a module having a density as low as three to five pounds per cubic foot, making the insulation qualities comparable to that of a fiberglass-insulated wood-frame wall of similar thickness that allows for required air circulation to avoid moisture condensation therein. Additionally, papercrete structures are more permeable to vapor and moisture than concrete and structures made with papercrete thus provide an improved environment.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A dry papercrete mix comprising a component comprising pulverized dry cellulose/paper pulp, said pulverized dry cellulose/paper pulp comprising a mix of fiber material and sand and/or glass particles of a size to pass through a 2 mm mesh screen in which at least approximately one-half of the sand and/or glass particles desired in said dry papercrete mix is retained in said mix of fiber material and sand and/or glass particles by adhesion to said fiber material, said dry papercrete mix further comprising additional dry sand and/or glass particles and dry Portland cement and/or a mixture of Pozzolana and lime, wherein the formulation of constituent materials is in the proportion of approximately 30 pounds of cellulose/paper fiber,
94 pounds of Portland cement,
50 pounds wood chips and sawdust,
100 pounds sharp sand and/or glass particles, wherein a volume of said Portland cement and said sharp sand and/or glass particles is replaced by a substantially equal volume of a mixture of Pozzolana and lime in a ratio of approximately 3:1, and
½ cup dry soap or detergent.

* * * * *